UNITED STATES PATENT OFFICE.

ALICE MARION HART, OF LONDON, ENGLAND, ASSIGNOR TO VIKING MANUFACTURING COMPANY LIMITED, OF LONDON, ENGLAND.

WATERPROOFING OF FABRICS, YARNS, AND OTHER MATERIALS.

1,131,929.     Specification of Letters Patent.     Patented Mar. 16, 1915.

No Drawing.     Application filed August 4, 1911. Serial No. 642,368.

*To all whom it may concern:*

Be it known that I, ALICE MARION HART, of London, England, have invented new and useful Improvements in or Relating to the Waterproofing of Fabrics, Yarns, and other Materials, of which the following is a specification.

This invention relates to improvements in the treatment of fabrics, papers, yarns, cords, leather and like materials to render them waterproof and if desired fireproof, the proofing being colored or not as may be desired.

In the following description, where reference is made to fabrics, it is intended to include the various materials referred to above.

In carrying out this invention I dissolve non-explosive nitrated cellulose (preferably prepared by the process described in my co-pending application, Serial No. 642,367 of even date) in ether and methylated spirit. The mixture is then worked into a smooth jelly. I then add to the jelly a small quantity of "lucrate" oil prepared by the process described in my British Patent No. 11,340/1909. The oil thus referred to is described as follows:—

"The object of the invention is to produce a perfectly pure oil, free from water and all impurities, and which will blend with spirit and celluloid, for the purpose of admixture with water-proofing materials. To this oil I propose to give the following name 'lucrate.'"

This lucrate consists of one of the following combinations and either combination may be used in the compound:

"(a) Of an animal fat and a vegetable oil.

"(b) Of an animal fat and a mineral oil.

"(c) Of an animal fat and an oleaginous matter obtained from seed waste of all kinds.

"The admixture thus produced will perfectly blend in the usual manner with spirit and celluloid, and is therefore a very valuable industrial product.

"In carrying out my invention, I operate in the following manner:

"(a) Animal fat derived from the sheep, ox, pig, horse, or any other animal, is cleaned or refined by being boiled in water, and the fat thereon collected from the surface on cooling. It is then put into a copper and run down. To one hundred weight of this melted fat is added one and a half ounces of caustic soda T W 13, and the whole well mulched together. It is then re-boiled at a temperature of from 200° to 250°, any water there may be escaping in steam, and a perfectly clear oil is drawn off. It is then ready for admixture with any vegetable oil such as linseed, cotton, and hemp seed, palm oil and colzerin (colza oil treated with caustic soda), in the following manner and proportions. To a definite amount of the animal oil while hot, is gradually added one and a half to twenty per cent. vegetable oil, being stirred during the process, and all impurities or adulterations present in the vegetable oil rise to the surface and are skimmed off, so that nothing but absolutely pure oil is left. This admixture is now ready for use.

"(b) A mineral oil such as paraffin oil, petrol, or the like, is substituted for the vegetable oil as described above, and is used in the following manner and proportions:

"Paraffin oil _____ 2½% to 20%.
"Petrol _____ 1½% to 20%.

"When paraffin oil is used, care must be taken not to allow the temperature to rise above 180° to 200°. The impurities of the mineral oils are skimmed off as before described. On cooling, the mixture is run off into vats ready to heat up next day.

"(c) A vegetable oil obtained from the waste of cotton seed, hemp seed or any oleaginous seed by well known processes, is substituted for the vegetable oil in combination (a) and is treated in the same manner as therein described."

The mixture is then diluted with methylated spirit to the required consistency.

The diluted jelly is applied to the fabric or material to be treated by a spreading machine, or the material is dipped into the jelly and passed between rollers, or in the case of yarns or rovings, these are passed through the jelly and are preferably twisted in emerging from the bath.

When it is desired to make the treated materials non-inflammable I may use the following method. Tungstate of soda is reduced to a very fine powder and mixed with a small quantity of "lucrate" oil and this mixture is worked into the jelly, preferably before dilution.

When it is desired to color the material I employ the following method. I grind the pigment employed for coloring purposes to a very fine powder and boil it in water. The scum is removed and the pigment allowed to settle, the supernatant water is decanted, and the residue dried at a gentle heat. The dried residue is mixed with a little methylated spirit into a smooth paste which is added to the nitro-cellulose jelly before the addition of any oil.

I have found the following proportion to give good results:—

| | |
|---|---|
| Nitrated cellulose | 1 lb. |
| Ether | 1 lb. |
| Methlyated spirit | 1 gallon. |
| "Lucrate" | 3 gills. |
| Sodium tungstate | ¾ oz. |
| Pigment | 1 lb. |

This standard solution is diluted as required say with 1–6 gallons of methylated spirit before use.

My process has several advantages over those hitherto proposed. Thus by the employment of my process I obtain a very transparent solution by means of which fabrics may be rendered translucent as well as waterproof and, if desired, fireproof. Very light fabrics may be treated and are rendered gas tight as well as waterproof (and fireproof if desired) and are therefore suitable for the construction of balloons and air ships. The treated fabrics do not stick nor do they crack. When I use pigments I obtain a colored but still transparent solution and this I attribute to the use of methylated spirit instead of oil for mixing the pigment prior to adding it to the solution of nitrated cellulose. Suitable materials when treated can be boiled and disinfected with superheated steam without injury to their waterproofing or other qualities, and are therefore suitable for surgical uses. The treated materials are without odor.

If it is not necessary that the treated materials shall be non-inflammable I may use other forms of nitrated cellulose such for example as scrap celluloid. When I employ scrap celluloid I prefer to select thin and transparent pieces. This scrap celluloid is stored in a tank in methylated spirit and taken out as required for use. The soaking renders it limp and easily soluble in ether. No special time in soak is necessary but I prefer not to use the material until it has been in soak for a few days. This soaked celluloid is dissolved in the same proportions as the cellulose hereinbefore referred to and is treated in the same way.

What I claim is:—

1. A solution for treating fabrics, comprising nitrated cellulose or celluloid dissolved in ether and methylated spirit containing a small quantity of "lucrate" composed of a mixture of purified animal oil and non-animal oil, whereby the spirit can be mixed with the dissolved cellulose or celluloid, substantially as described.

2. A solution for treating fabrics, comprising nitrated cellulose or celluloid dissolved in ether and methylated spirit containing a small quantity of "lucrate" composed of a mixture of purified animal oil and non-animal oil, whereby the spirit can be mixed with the dissolved cellulose or celluloid, combined with tungstate of sodium, substantially as described.

In witness whereof I have signed my name to this specification in the presence of two subscribing witnesses.

ALICE MARION HART.

Witnesses:
R. WILLIAMS,
M. RINGER-HERVETT.